United States Patent
Saito et al.

(10) Patent No.: US 9,658,410 B2
(45) Date of Patent: May 23, 2017

(54) OPTICAL CONNECTOR, METHOD FOR ALIGNING MULTI-CORE FIBER WITH BUNDLE STRUCTURE, AND FIBER ARRANGEMENT CONVERSION MEMBER

(71) Applicant: FURUKAWA ELECTRIC CO., LTD., Tokyo (JP)

(72) Inventors: Tsunetoshi Saito, Tokyo (JP); Kengo Watanabe, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 348 days.

(21) Appl. No.: 14/021,600

(22) Filed: Sep. 9, 2013

(65) Prior Publication Data

US 2014/0010500 A1    Jan. 9, 2014

Related U.S. Application Data

(63) Continuation of application No. PCT/JP2012/055926, filed on Mar. 8, 2012.

(30) Foreign Application Priority Data

Mar. 9, 2011    (JP) .................................. 2011-051265

(51) Int. Cl.
*G02B 6/40* (2006.01)
*G02B 6/38* (2006.01)
*G01B 11/27* (2006.01)

(52) U.S. Cl.
CPC ............. *G02B 6/40* (2013.01); *G01B 11/272* (2013.01); *G02B 6/3885* (2013.01); *G02B 6/403* (2013.01)

(58) Field of Classification Search
CPC .................................................... G02B 6/3885
See application file for complete search history.

(56) References Cited

U.S. PATENT DOCUMENTS 5,241,613 A * 8/1993 Li ............................. G02B 6/02
385/29
5,748,820 A * 5/1998 Le Marer ........... G02B 6/02042
385/76

(Continued)

FOREIGN PATENT DOCUMENTS

EP    0674198 A1    9/1995
EP    2209031 A2    7/2010

(Continued)

OTHER PUBLICATIONS

Extended European Search Report dated Aug. 27, 2014, corresponding to European patent application No. 12755334.5.

(Continued)

*Primary Examiner* — Michelle R Connelly
(74) *Attorney, Agent, or Firm* — Hauptman Ham, LLP

(57) ABSTRACT

An optical connector is structured so as to include a fiber connection structure therein. A multi-core fiber is included inside a ferrule, and affixed to the ferrule substrate. One end surface of the multi-core fiber is exposed to an end surface of the ferrule. The other end of the multi-core fiber passes through and is affixed to a capillary. A plurality of optical fiber pass through a capillary that faces the capillary, and are affixed thereto the capillary in the same manner. Seven optical fiber cores of the same diameter are joined in a close-packed arrangement in the fiber connection structure.

7 Claims, 19 Drawing Sheets

(56) References Cited

U.S. PATENT DOCUMENTS

| | | | |
|---|---|---|---|
| 2005/0244108 A1* | 11/2005 | Billman | G02B 6/3846 |
| | | | 385/60 |
| 2008/0310800 A1* | 12/2008 | Shibata | G02B 6/3825 |
| | | | 385/92 |
| 2009/0136182 A1 | 5/2009 | Oshima | |
| 2010/0195965 A1 | 8/2010 | Sasaoka | |
| 2010/0290750 A1 | 11/2010 | Inamura | |

FOREIGN PATENT DOCUMENTS

| | | | | |
|---|---|---|---|---|
| FR | 2747800 A1 | * | 10/1997 | ............... G02B 6/28 |
| GB | WO 03098290 A1 | * | 11/2003 | ........... G02B 6/2848 |
| JP | 55-096905 A | | 7/1980 | |
| JP | 56-083712 B2 | | 7/1981 | |
| JP | 58-014108 A | | 1/1983 | |
| JP | 60011804 A | * | 1/1985 | |
| JP | 61167911 A | * | 7/1986 | |
| JP | 61282807 A | * | 12/1986 | |
| JP | 62-047604 A | | 3/1987 | |
| JP | 62047604 A | * | 3/1987 | |
| JP | 62-129507 U | | 8/1987 | |
| JP | 63-307409 A | | 12/1988 | |
| JP | 02-082212 A | | 3/1990 | |
| JP | 03-012607 A | | 1/1991 | |
| JP | 04-104104 A | | 4/1992 | |
| JP | H0627889 B2 | * | 4/1994 | |
| JP | 09-061632 A | | 3/1997 | |
| JP | 2004-101989 A | | 4/2004 | |
| JP | 2007-279194 A | | 10/2007 | |
| JP | 2007-316480 A | | 12/2007 | |
| JP | 2008-070675 A | | 3/2008 | |
| JP | 2008070675 A | * | 3/2008 | |
| JP | 2008-083155 A | | 4/2008 | |
| JP | 2010-152163 A | | 7/2010 | |
| JP | 2010-286661 A | | 12/2010 | |
| JP | 2010286548 A | * | 12/2010 | |
| JP | 2010286661 A | * | 12/2010 | |
| JP | 2011-018013 A | | 1/2011 | |
| JP | 2012-022176 A | | 2/2012 | |

OTHER PUBLICATIONS

International Search Report corresponding to PCT/JP2012/055926, dated Jun. 5, 2012.

* cited by examiner

Fig. 2
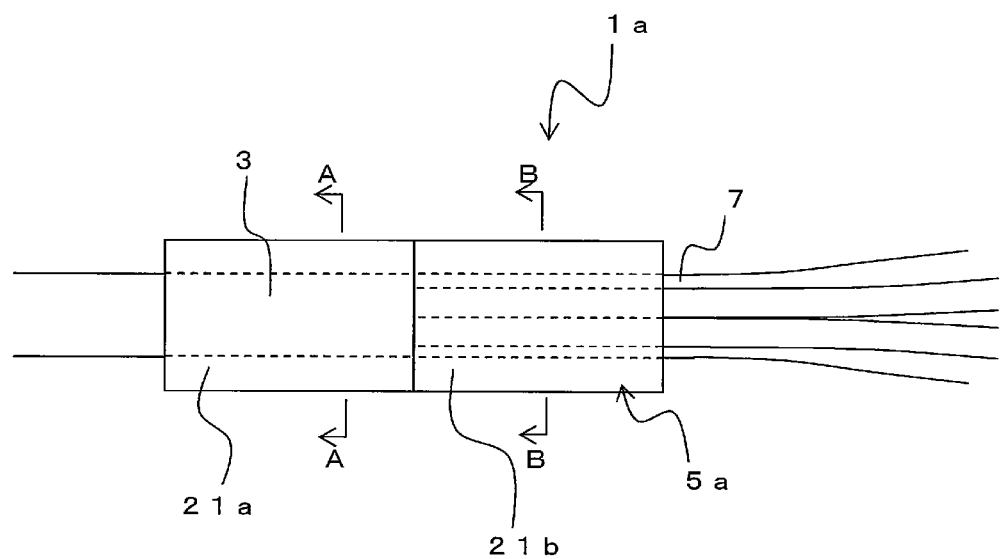
(a)
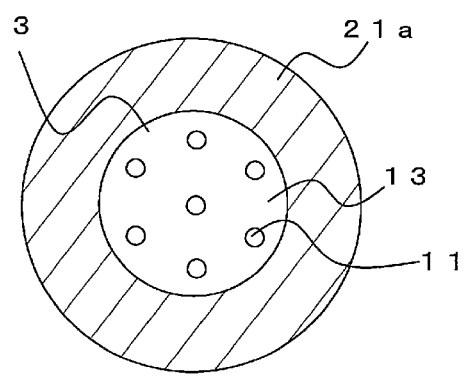
(b)

Fig. 5
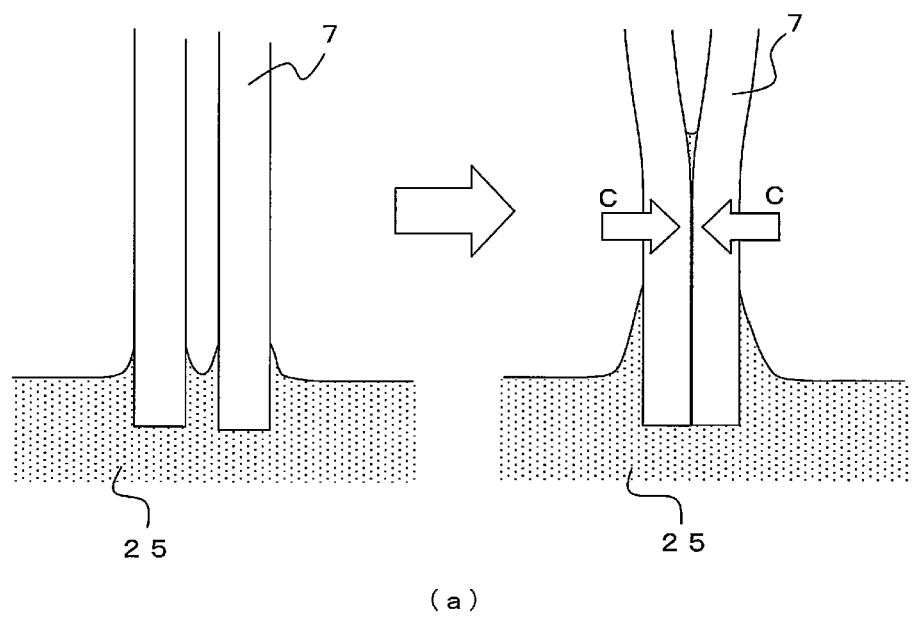
(a)
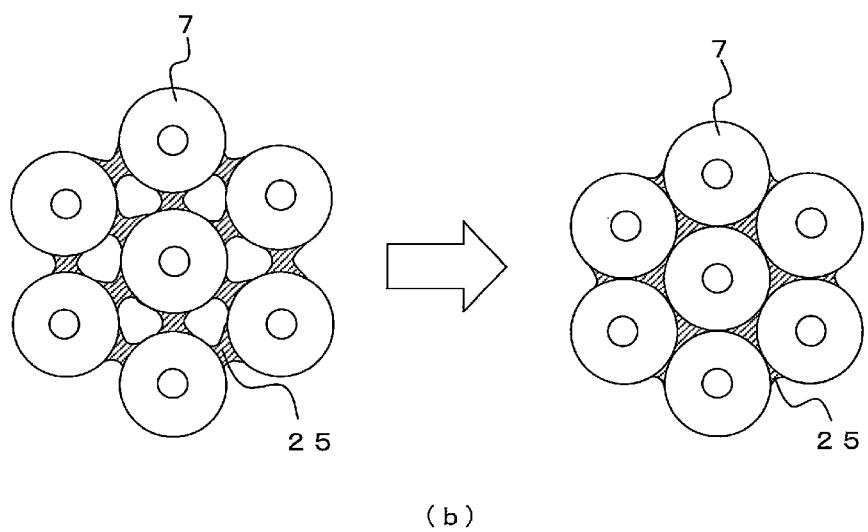
(b)

Fig. 8
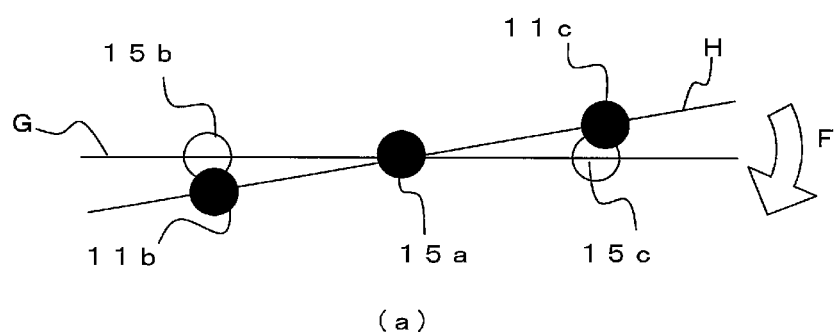
(a)
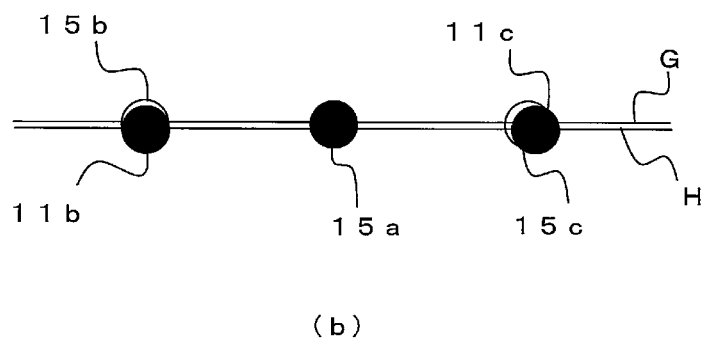
(b)

Fig. 16
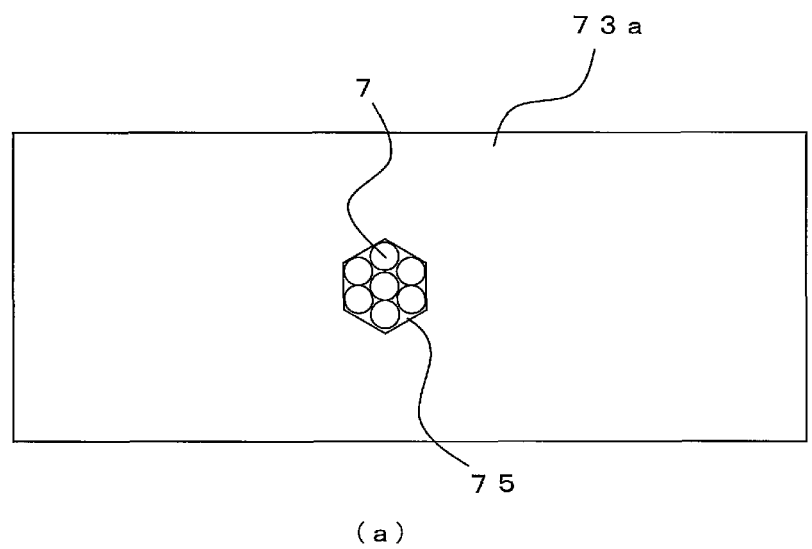
(a)
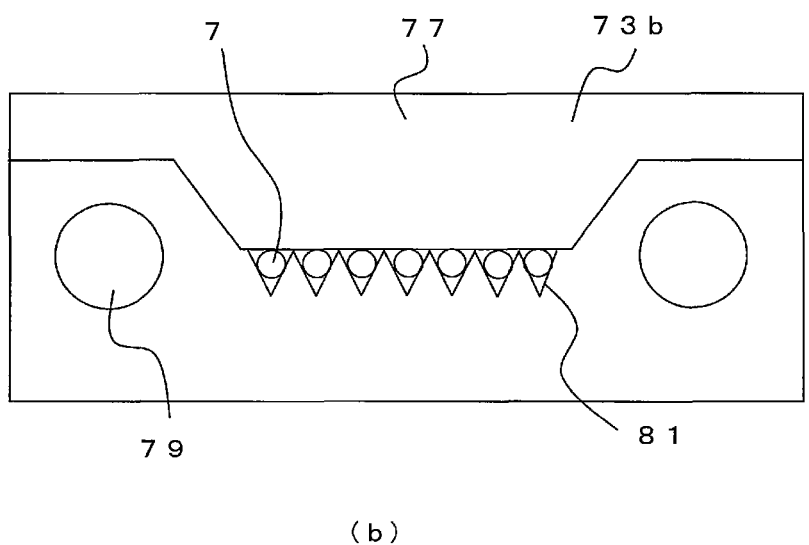
(b)

Fig. 17
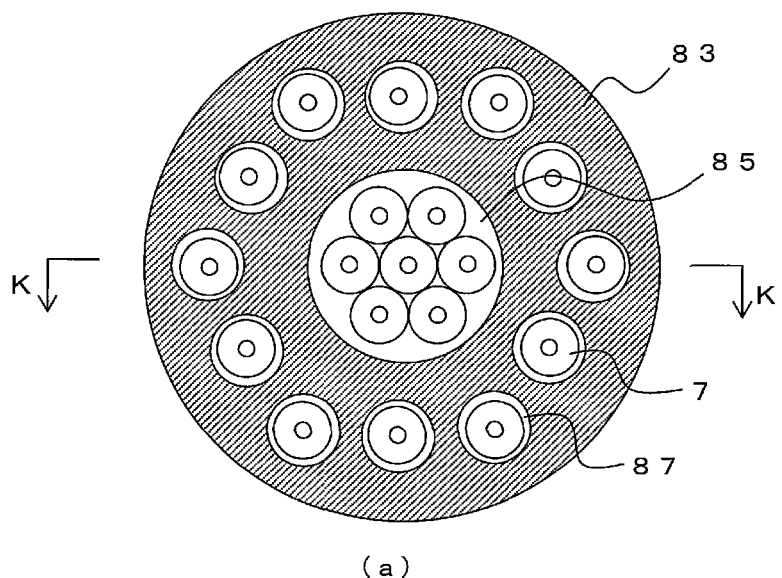
(a)
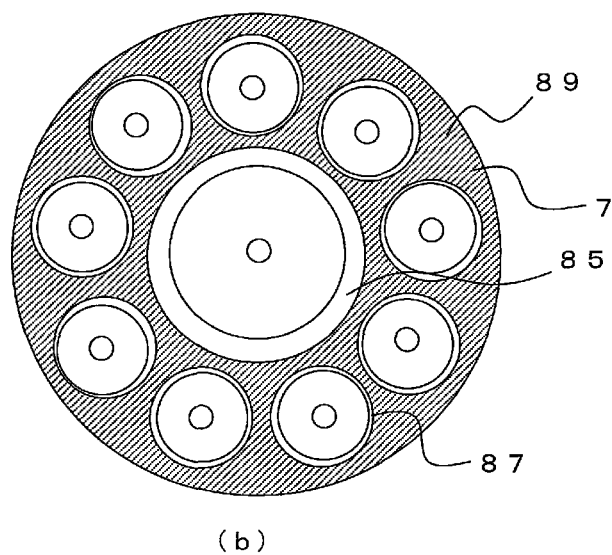
(b)

Fig. 18
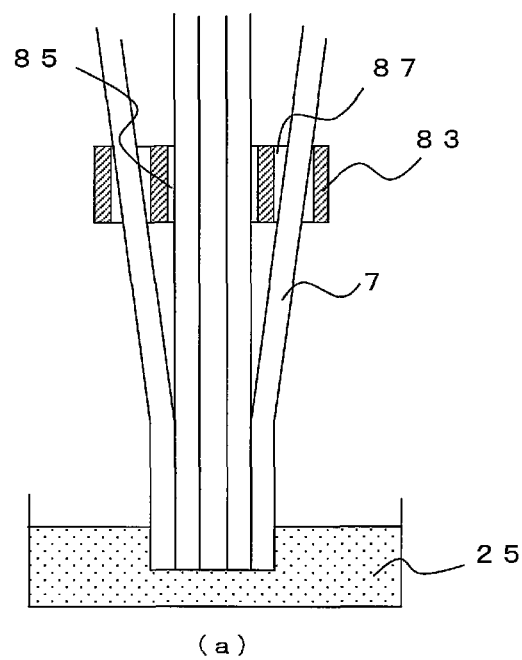
(a)
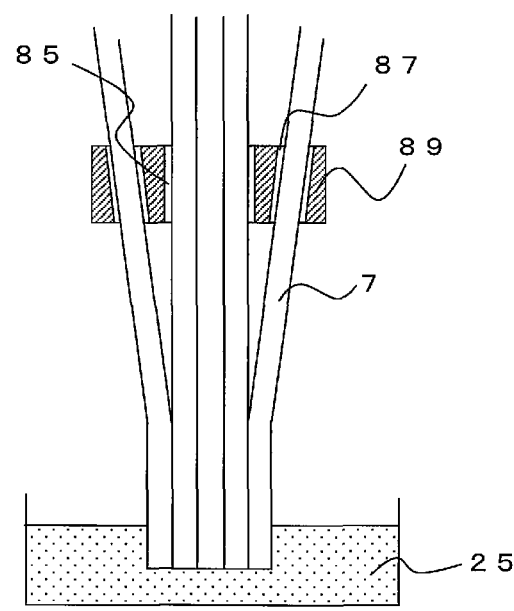
(b)

Fig. 19
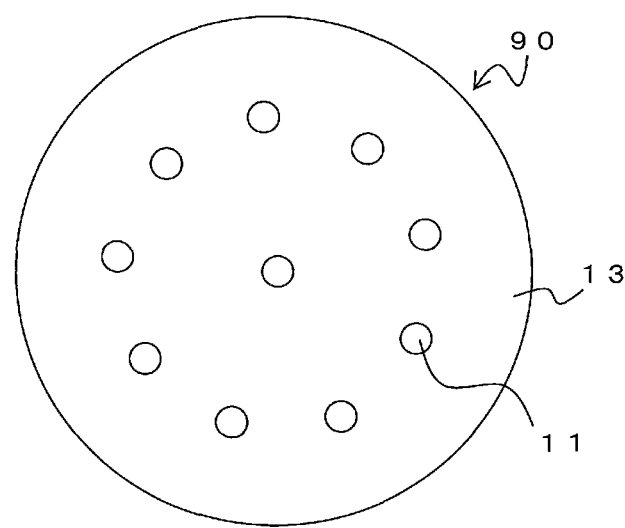
(a)
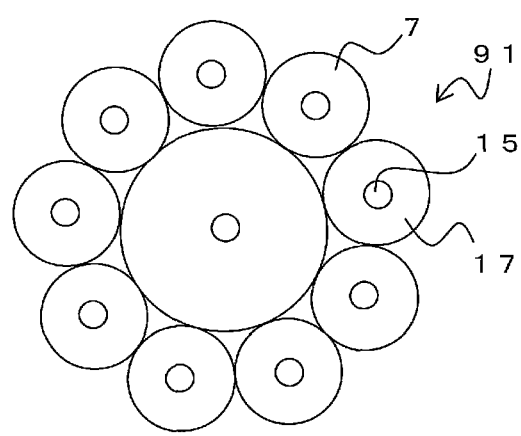
(b)

OPTICAL CONNECTOR, METHOD FOR ALIGNING MULTI-CORE FIBER WITH BUNDLE STRUCTURE, AND FIBER ARRANGEMENT CONVERSION MEMBER

RELATED APPLICATIONS

The present application is a continuation of International Application Number PCT/JP2012/055926, filed Mar. 8, 2012, and claims priority from, Japanese Application Number 2011-051265, filed Mar. 9, 2011. The above listed applications are hereby incorporated by reference in their entirety.

FIELD OF THE INVENTION

This invention relates to an optical connector including a connection structure connecting a multi-core fiber having plural cores to a bundle structure in which plural optical fibers are bundled, to a method for aligning the multi-core fiber with the bundle structure, and to the others.

BACKGROUND OF THE INVENTION

Due to rapid increase of traffic in optical communications in recent years, data-transmission capacity through a single-core optical fiber presently utilized is approaching the limit. Then, as a means to expand communication capacity furthermore, a multi-core fiber in which plural cores are formed in one fiber has been proposed.

As such a multi-core fiber, for example, there is one having plural core parts within a cladding part and having a flat part perpendicular to the longitudinal direction in one part of the outer circumference of the cladding part (See Patent Document 1).

When the multi-core fiber is utilized as a transmission line and receives/sends transmission signals, each core part of the multi-core fiber needs to be connected to a corresponding core part of another multi-core fiber, to an individual optical fiber and to an individual optical element or the like. For connecting such a multi-core fiber to single-core fibers to receive/send transmission signals, a method has been proposed, in which the multi-core fiber is connected to a bundle fiber having single-core optical fibers arranged at the corresponding positions of the respective core parts of the multi-core fiber (See Patent Document 2). Also, as a method for producing such bundled optical fibers, a method to bundle plural single-core fibers at the predetermined intervals by binding them has been proposed (See Patent Document 3).

PRIOR ART DOCUMENTS

Patent Documents

[Patent Document 1] Japanese Unexamined Patent Application Publication No. 2010-152163 (JP-A-2010-152163)
[Patent Document 2] Japanese Unexamined Patent Application Publication No. S62-47604 (JP-A-S62-47604)
[Patent Document 3] Japanese Unexamined Patent Application Publication No. H03-12607 (JP-A-H03-12607)

SUMMARY OF THE INVENTION

Problems to be Solved by the Invention

As described above, when each of the core parts of the multi-core fiber is connected to the individual optical fiber, the core parts of the multi-core fiber and the cores of the optical fibers at their connected end surfaces have to be optically precisely connected together, respectively. However, usually, the interval between the core parts of the multi-core fiber is narrow (40 to 50 µm, for example), and thus the usual optical fiber (having the external diameter of 125 µm) cannot be utilized. That is, the optical fiber having the size of the external diameter not exceeding the interval between the core parts of the multi-core fiber must be utilized.

However, such an optical fiber is extremely thin and is difficult to be handled. Also, especially when a single mode fiber is used, the amount of the axis misalignment at the connected part must be restricted to 1 to 2 µm or smaller and so a very high positional accuracy is required for alignment.

Thus, if a bundle of fibers is mechanically formed by pressing force from outside or the like as described in the conventional Patent Document 3, the positions of the respective cores of the single-core fibers are not precisely arranged at the intended positions and the intervals between the cores vary a little. As a result, misalignment between the respective cores of the connection target multi-core fiber and the respective cores of the bundle of fibers is caused, and the optical loss arises as a results. That is, at present any satisfactory method for precisely aligning the connection structure between a multi-core fiber and respective optical fibers with the minimum optical loss have not been proposed.

The present invention was achieved in view of such problems. Its object is: to provide an optical connector, comprising a connection structure in its inside between a multi-core fiber having core parts arranged with a narrow pitch and a bundle structure in which plural optical fibers are bundled, and thus having a function to convert a multi-core fiber into a bundle structure and vice versa; and to provide a method for aligning the multi-core fiber with the bundle structure, and others.

Means for Solving Problems

To achieve the above object, the first invention provides an optical connector containing a fiber connection structure: which optically connects a multi-core fiber having plural cores at predetermined intervals to a bundle structure having plural optical fibers bundled in close-packed arrangement, and which is accommodated in the optical connector.

An end of the bundle structure may be connected to the multi-core fiber, and the end of the multi-core fiber may be exposed on an end surface of the optical connector. The optical connector comprises a first capillary on the front side of a ferrule, a second capillary on the rear side of the ferrule and a connector flange part; the multi-core fiber is inserted into the first capillary; the bundle structure is inserted into the second capillary; and the first capillary and the second capillary may be joined together rearward the connector flange part.

Also, the optical connector may comprise a first capillary on the front side of a ferrule, a second capillary on the rear side of the ferrule and an optical connector flange part; the multi-core fiber is inserted into the first capillary; the bundle structure is inserted into the second capillary; the first capillary and the second capillary are joined together frontward the connector flange part; and the external diameter of the second capillary may be smaller than that of the first capillary.

The first capillary consists of a zirconia capillary and a glass capillary, and the glass capillary on the rear end side of the first capillary and the second capillary may be joined together with an ultraviolet hardening adhesive.

An end of the multi-core fiber is connected to the bundle structure, and the ends of the respective optical fibers forming the bundle structure may be exposed on an end surface of the optical connector.

According to the first invention, a connection structure of a multi-core fiber and plural optical fibers is embedded inside the optical connector. Thereby, if the multi-core fiber is exposed on an end surface of the optical connector, it can be easily connected to an identical multi-core fiber and thus, a multi-core fiber can be separated into the plural optical fibers through the optical connector. Similarly, if the ends of plural optical fibers are exposed on the end surface of the optical connector, they can be connected to identical optical fibers, respectively. Namely, it is possible to convert from the optical fibers into the multi-core fiber and vice versa inside the optical connector.

Also, in the connection structure within the optical connector, if an end part of the multi-core fiber and the bundle structure are inserted into capillaries, respectively, and the capillaries are connected together such that they face each other, the connection work of this connection part becomes easy.

The second invention is a method for aligning a multi-core fiber having plural cores with a bundle structure in which plural optical fibers are bundled. Core parts in the multi-core fiber are formed at a predetermined interval in its cross-section; and plural optical fibers are joined together and bundled in a state in which they are arranged close-packed in the cross-section of the bundle structure at an interval approximately equal to the interval between the core parts of the multi-core fiber. The method comprises: a step of aligning the central core of the multi-core fiber with the central fiber of the bundle structure through the following operation process: keeping the multi-core fiber and the bundle structure in a way that the central core of the multi-core fiber and the central fiber of the bundle structure face each other; and changing the relative positions of the central core and the central fiber within the facing plane until the detected light intensity is maximized while inputting light from the central core or from the central fiber and detecting the light at the central fiber or at the central core on the other side; a step of making parallel a pair of cores of the multi-core fiber which are placed axisymmetrically about the central core with a pair of fibers of the bundle structure by: rotating the multi-core fiber relatively with respect to the bundle structure around the position of the central core of the multi-core fiber, while inputting light from above described pair of cores of the multi-core fiber or a pair of fibers of the bundle structure and detecting the light at the pair of fibers or cores on the other side; and a step of joining and fixing together the multi-core fiber and the bundle structure in that state.

After the arrangement direction of a pair of cores or fibers on one side of the facing plane are made parallel with that of a pair of fibers or cores on the other side, the amount of axis misalignment with the connection target core of the core having the maximum amount of axis misalignment may be minimized by slightly moving the multi-core fiber relative to the bundle structure in two mutually vertical directions until reaching the above intended position, and the multi-core fiber and the bundle structure may be joined and fixed together at that position.

According to the second invention, the alignment of a multi-core fiber with a bundle structure in which plural optical fibers are bundled can be reliably performed. Accordingly, the multi-core fiber and the bundle structure can be certainly optically connected together.

The third invention provides a fiber arrangement conversion member for converting arrangements of plural optical fibers. The fiber arrangement conversion member comprises a main body and plural optical fibers; a first fixing part with approximately hexagonal shape is formed on one end of the main body; plural optical fibers are fixed in a close-packed arrangement at the first fixing part; a second fixing part in the shape of plural grooves in a row is formed on the other end of the main body; and the optical fibers are provided in a row and are fixed in the second fixing part, respectively.

According to the third invention, it is possible to connect the multi-core fiber and an optical fiber ribbon easily.

Effects of the Invention

The present invention can provide: an optical connector, comprising in its inside a connection structure connecting a multi-core fiber having narrow-spaced core parts to a bundle structure having bundled plural optical fibers, and thus having a function to convert the multi-core fiber into the bundle structure and vice versa; a method for aligning the multi-core fiber with the bundle structure, and others.

BRIEF DESCRIPTION OF THE DRAWINGS

FIG. 2 show a fiber connection structure 1a. FIG. 2(a) is its front view and FIG. 2(b) its cross-sectional view at the A-A line shown in the FIG. 2(a).

FIG. 5 show how closely gathered structure between the neighboring optical fibers is formed.

FIG. 7 show a method for aligning a multi-core fiber 3 with the bundle structure 5a.

FIG. 8 show a method for aligning the multi-core fiber 3 with the bundle structure 5a.

FIG. 9 shows an optical connector 10a.

FIG. 12 shows an optical connector 50.

FIG. 15 shows a fiber arrangement conversion member 70.

FIG. 16(a) is a view from the I arrow direction shown in the FIG. 15, and FIG. 16(b) is a view from the J arrow direction shown in the FIG. 15.

FIG. 17 show a jig 83 and a jig 89.

FIG. 18 show manufacturing procedures of a bundle structure utilizing the jig 83.

FIG. 19 show a multi-core fiber 90 and a bundle structure 91.

DETAILED DESCRIPTION OF THE PREFERRED EMBODIMENTS

Figure 1:
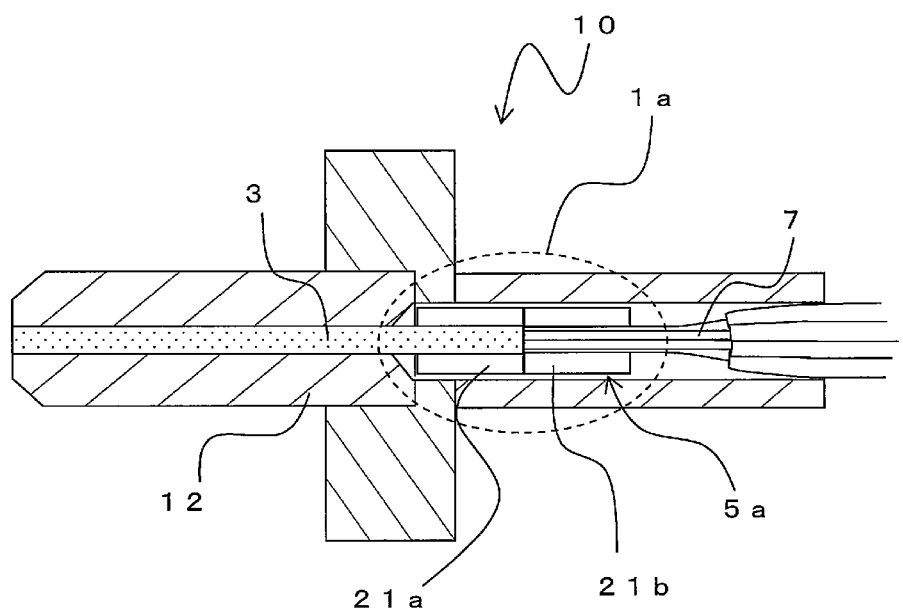
FIG. 1 shows an optical connector 10.

Hereinafter, an optical connector 10 according to an embodiment of the present invention will be described. FIG.

1 is a front cross-sectional view of the optical connector 10. The optical connector 10 contains a fiber connection structure 1a in its inside.

A multi-core fiber 3 is embedded within a ferrule 12 and is fixed to a ferrule substrate. One end of the multi-core fiber 3 exposes on an end surface of the ferrule 12. Namely, the multi-core fiber 3 can be connected to other multi-core fibers or the like embedded in other optical connectors.

The other end of the multi-core fiber 3 is inserted into and fixed to a capillary 21a. In a capillary 21b facing the capillary 21a, plural optical fibers 7 are inserted into and fixed to the capillary 21b in a similar way. In the fiber connection structure 1a, the capillary 21a and the capillary 21b are joined with adhesives, etc. That is, the multi-core fiber 3 and the plural optical fibers 7 are connected together. Here, a structure in which the plural optical fibers 7 are inserted into the capillary 21b and bundled is referred to as a bundle structure 5a. That is, the capillary 21a in which the multi-core fiber 3 is fixed is joined with the bundle structure 5a.

Figure 3:
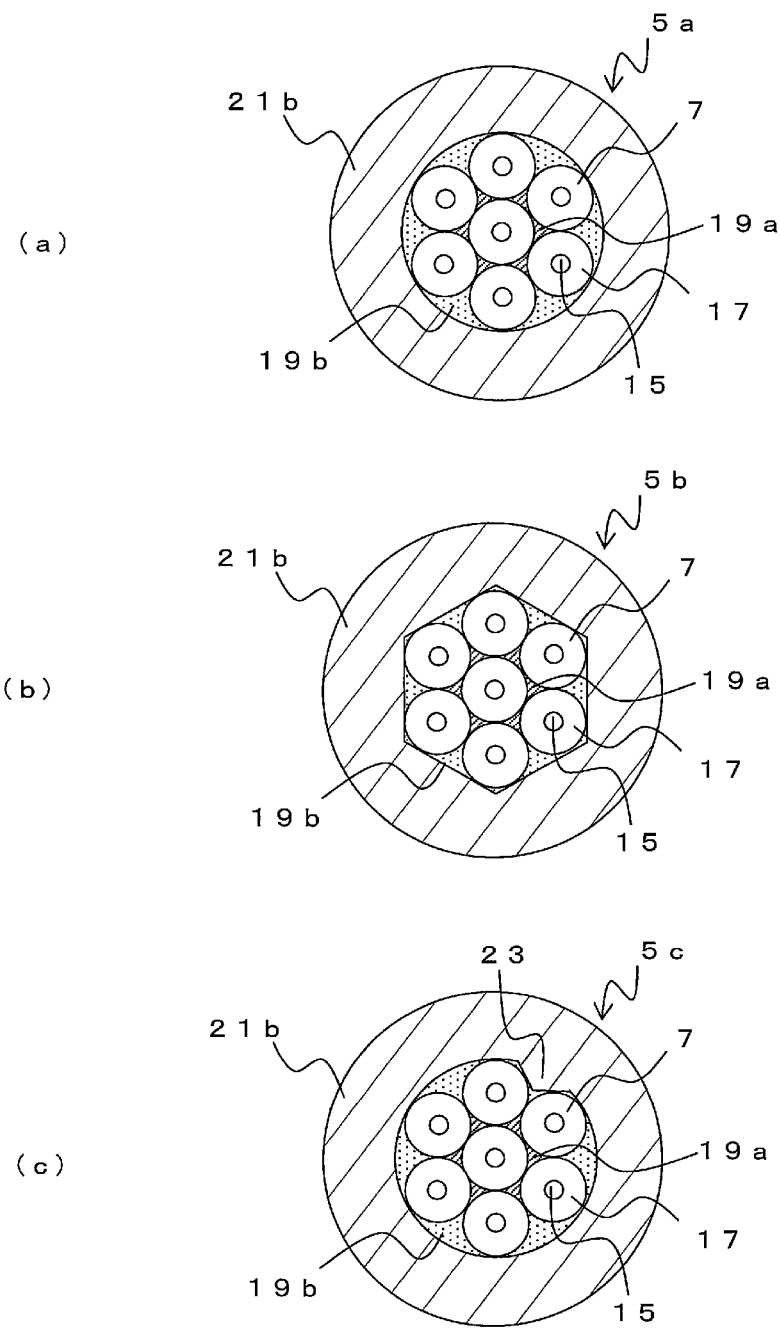
FIG. 3(a) shows a bundle structure 5a and is a cross-sectional view at the B-B line shown in the FIG. 2(a).
FIG. 3(b) shows a bundle structure 5b.
FIG. 3(c) shows a bundle structure 5c.

FIG. 2(a) is an enlarged view of the fiber connection structure 1a, FIG. 2(b) is a cross-sectional view at the A-A line in the FIG. 2(a), and FIG. 3(a) is a cross-sectional view at the B-B line in the FIG. 2(a).

The multi-core fiber 3 includes plural cores 11 arranged at predetermined intervals and a cladding 13 covering their surroundings, as shown in the FIG. 2(b). Seven cores 11 in total are placed at the center of the multi-core fiber 3 and at each vertex position of a regular hexagon around the center of the multi-core fiber 3. That is, all the intervals between a central core 11 and the six cores 11 in its periphery are equal. Also, the intervals between the mutually neighboring cores 11 in the six peripheral cores are equal. Here, the pitch of the cores 11 is approximately 40 to 50 μm, for example.

As described above, the multi-core fiber 3 is inserted into the capillary 21a. The capillary 21a is a cylindrical member which has a hole in its inside. The hole in the capillary 21a is slightly larger than the external diameter of the multi-core fiber 3. The multi-core fiber 3 and the capillary 21a are bonded together with an adhesive, for example. In this case, it is desirable that the refractive index of the used adhesive is smaller than that of the cladding 13 of the multi-core fiber 3. In this way, leak of light from the cladding can be prevented.

Also, as shown in the FIG. 3(a), in the bundle structure 5a, seven optical fibers of the same diameter are joined in the close-packed arrangement. That is, an optical fiber 7 is placed in the center and six optical fibers 7 are placed on its periphery. Therefore, all the cores 15 of the optical fibers 7 are placed at the same interval. In addition, the optical fibers 7 are mutually bonded together with the adhesive 19a. Thus, all claddings 17 of the neighboring optical fibers 7 contact mutually directly or through the adhesive 19a. The gap between the neighboring optical fibers 7 is also filled with the adhesive 19a.

The multi-core fiber 3 and the optical fibers 7 are made of quartz glass, for example. In this embodiment, although an example of a close-packed arrangement which is formed by seven cores in total, having six cores on the outer circumference of one central core, will be explained, but twelve cores can further be added on its outer circumference in the close-packed arrangement. That is, in the present invention, as long as the cores are placed close-packed, their number is not limited.

However, the present invention intends to arrange the fibers in a close-packed structure by self-alignment process due to the balance of surface tension of the adhesive or the like which infiltrates into the gap between the fibers. Thus, the bundle structure having seven fibers is formed most accurately, and next, the bundle structure further equipped with twelve cores on its outer circumference can be formed with sufficient accuracy. Although the present invention is applicable to the bundle structure having more fibers, the accuracy of alignment of cores (especially on the outer circumference side) decreases. However, when the number of fibers is increased, degree of the misalignment of cores can be decreased by forming a bundle structure step by step, for example, in a way that: a bundle structure having seven fibers is formed; and after the seven fibers are bonded together, twelve fibers are bonded on their outer circumference through the surface tension.

The optical fibers 7 are inserted into the capillary 21b in the close-packed state. The capillary 21b is a cylindrical member having a hole inside, and the cross-section of the hole of the capillary 21b is a circle having slightly larger diameter than the external diameter of the circumscribed circle of the optical fibers 7 in the close-packed arrangement. Also, the optical fibers 7 and the capillary 21b are bonded together by the adhesives 19b. Here, it is desirable that the refractive index of adhesives 19b is smaller than that of the cladding 17 of the optical fiber 7. In this way, leak of light from the cladding can be prevented. In addition, the adhesives 19b may be identical with the adhesives 19a.

An end surface of the multi-core fiber 3 (an end surface of the capillary 21a) and the end surface of the bundle structure 5 (an end surface of the capillary 21b) are polished and placed face to face. In this state, respective cores 11 face respective cores 15 with each other at the position where they are optically connected. That is, the pitch of the cores 11 is approximately equal to the external diameter of the optical fibers 7 (the diameter of the cladding 17). Taking into consideration that the adhesive layer is formed by the adhesives 19a in the gaps between the neighboring optical fibers, the external diameter of the optical fiber 7 (the cladding 17) may be set to be 0.1 to 0.3 μm smaller than the pitch of the cores 11 of the multi-core fiber 3. Also in this case, the interval between individual cores 15 in the bundle structure in which the optical fibers 7 are bonded together is equal to the pitch of the cores 11.

End surfaces of the capillary 21a and 21b are fixed together with an adhesive or the like in a state where they are placed facing each other and the cores 11 and the cores 15 are optically connected respectively. Details of the position adjustment will be described later but is performed as follows in short: the capillaries 21a and 21b are arranged such that their facing end surfaces face each other; at least one capillary is fixed by a jig having a rotational mechanism; while signal light is inputted in each core of the multi-core fiber 3 from the end opposite to the facing end surface and the signal light which is outputted from the end of the bundle fiber opposite to the facing end surface is received, position adjustment and rotation adjustment of the bundled fibers (or the multi-core fiber) is performed; the jig is fixed at the position where the light signal output is maximized; and both fibers are bonded (or fused) to be connected with each other.

Here, since the close-packed bundled fibers of the present invention have a very high positional accuracy of the cores, adjustment has only to be performed on at least two cores. If position adjustment is performed first on the central core and next on circumferential one or two cores, the task will be simple and the accuracy will be improved. Naturally, it is also possible to measure the amount of axis misalignment for all the cores and perform position adjustment on the most optimal position in order to perform more accurate position adjustment.

Thus, a connection structure in which each core 11 of the multi-core fiber 3 and corresponding core 15 of the optical fiber 7 are optically connected, can be obtained. Here, in the fiber connection structure 1a, since the optical fibers 7 are bundled in a close-packed arrangement, the intervals between the cores 15 can be kept equal with sufficient accuracy. Also, since an end of the multi-core fiber 3 and that of the bundle structure 5a are accommodated in the capillaries 21a and 21b respectively, both the multi-core fiber and the bundled fibers are easily handled. Also, since the surfaces of the capillaries are joined together and so the joint area is wide, they can be certainly joined.

The connection structure of the present invention between the seven-core bundle structure and the seven-core multi-core fiber as above described have shown improvement in signal energy loss by 1 dB on the average among the seven cores compared with the conventional connection structure between the seven-core bundle structure and the seven-core multi-core fiber.

The bundle structure in which the optical fibers 7 are inserted into the capillary 21b can be a bundle structure 5b shown in FIG. 3(b). The hole within the capillary 21b of the bundle structure 5b does not have a round shape but has an approximately regular hexagonal shape. Namely, the hole is an approximately regular hexagon which circumscribes to the close-packed arrangement of the optical fibers 7, and the optical fibers 7 are placed at its vertexes, respectively. Accordingly, the arrangement of the optical fibers 7 is restricted, and the optical fibers 7 can be always arranged at specific circumferential positions with respect to the capillary 21b.

Also, the bundle structure may be a bundle structure 5c as shown in FIG. 3(c). The bundle structure 5c has a projection 23 in at least a part of the inner surface of the approximately circular hole within the capillary 21b. That is, on the inner surface of the circle which circumscribes the close-packed arrangement of the optical fibers 7, the projection 23 is formed such that it fits in the concave part formed in the gap between the neighboring optical fibers 7 in the close-packed arrangement. Accordingly, the arrangement of the optical fibers 7 is restricted and the optical fibers 7 can always be arranged at the specific circumferential position with respect to the capillary 21b. Only one or plural projections 23 may be formed.

Figure 4:
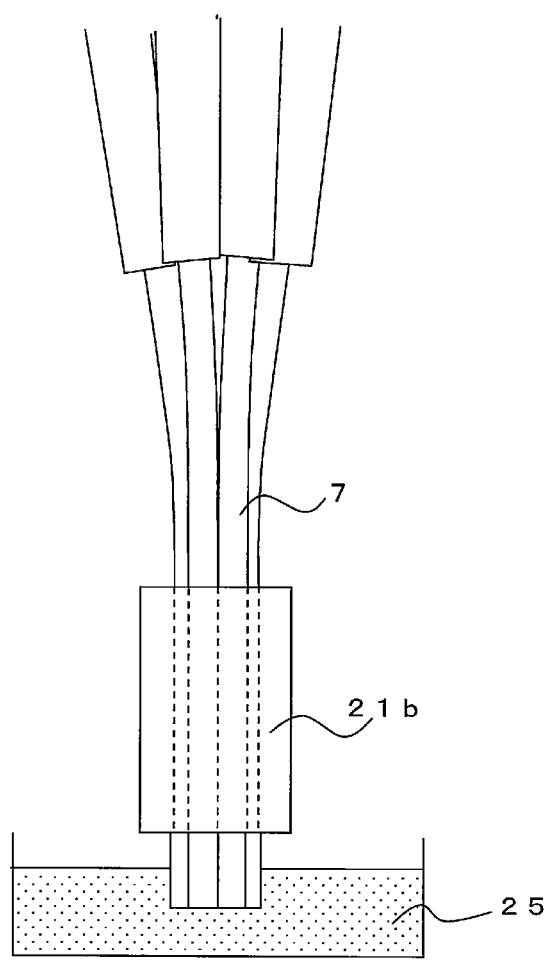
FIG. 4 shows a manufacturing procedure of a bundle structure.

Next, a manufacturing method of the bundle structure will be explained, especially targeting the bundle structures 5a to 5c in which the optical fibers 7 are bonded close-packed together. First, as shown in FIG. 4, coats of the predetermined number of the optical fibers 7 are removed and the stripped parts of the optical fibers 7are inserted into the capillary 21b. On this occasion, the optical fibers 7 are inserted into the capillary 21b such that the ends of the optical fibers 7 protrude by the same length, respectively (about 10 mm, for example) from an end of the capillary 21b. The capillary 21b is temporarily fixed to the optical fibers 7, for example.

The ends of the optical fibers 7 protruded from the end of the capillary 21b are soaked in an adhesive 25 placed in a container in advance. The adhesive 25 is a liquid adhesive, for example, and is a liquid containing solid state polymers such as synthetic resin dissolved in solvents such as water, alcohol, and organic solvents. When such a liquid adhesive is utilized to bond the optical fibers 7, the solute remained after the solvent evaporated, hardens and bonds the optical fibers 7 together.

The adhesives 25 with lower solute concentration than the normally utilized one are desirable. In that way, viscosity of the adhesive can be lowered and solute quantity which remains can be reduced. Thereby, the thickness of the adhesive layer between the optical fibers is reduced and the intervals between the optical fibers 7 can be kept uniform with higher accuracy. That is, although adhesive strength may become weak, an adhesive with very low viscosity of 100 cps or less, for example, is desirable. An effect of gathering the optical fibers more closely together is obtained by the adhesive contraction at the time of hardening. The adhesive with lower refractive index than that of the cladding of the optical fibers is desirable.

As such an adhesive, for example, we can use the followings, for example: as a solution system adhasive, "Cemedine C" (a trade name) made by Cemedine Co., Ltd., diluted utilizing a thinner (it is desirable to add fluoride for adjustment of the refractive index); as a very low viscosity adhesive (acrylate type), a refractive index control resin (UV hardening) made by NTT-Advanced Technology corporation, and as an adhesive with a very low viscosity (epoxy type), a heat hardening type adhesive made by Epoxy Technology Inc. Since viscosity of the adhasive can be lowered more by heating the adhesive, the gaps between the optical fibers can be made smaller after adhesion.

The optical fibers 7 are inserted into the capillary 21b in the approximately close-packed state, but before the ends of the optical fibers 7 are soaked in the adhesive 25, the optical fibers are hard to be kept perfectly close-packed (at the uniform core intervals), and gaps can be formed between the optical fibers at a part and a too closely gathered part can be formed at the other parts.

FIG. 5 are schematic diagrams showing the states of the optical fiber 7 before and after they are gathered closely by the surface tension of the adhesive 25. FIG. 5(a) are front views (for simplification, only two optical fibers 7 are shown) and FIG. 5(b) are cross-sectional views.

As described above, gaps may be formed in some cases between the optical fibers 7. Also in such case, the adhesive 25 is sucked into the gaps between the optical fibers 7 by surface tension (by capillarity) because viscosity of the adhesive 25 is low. At this time, the optical fibers 7 are gathered closely together by the surface tension (to the direction of the arrows C in the figure).

That is, as shown in the FIG. 5(b), even if some uneven gaps are formed between the optical fibers 7, the adhesive 25 is sucked up into the gaps and the optical fibers 7 are closely gathered together. On this occasion, the optical fibers are arranged in a configuration in which the surface tension of the adhesive sucked up into and existing at the gap between respective fibers stabilizes; namely, the optical fibers 7 are certainly arranged close-packed. And at the same time, the optical fibers 7 can be mutually bonded together by the hardened adhesive 25 in this state. Such an effect is especially effective for the very minute optical fibers 7 (the diameter Φ is 50 μm or less, for example) as in the present invention. Since the adhesive 25 is diluted solution type, gaps may be created after hardening in the bundle of fibers at the parts where the neighboring fibers were not closely gathered by the contraction of the adhesive.

Figure 6:
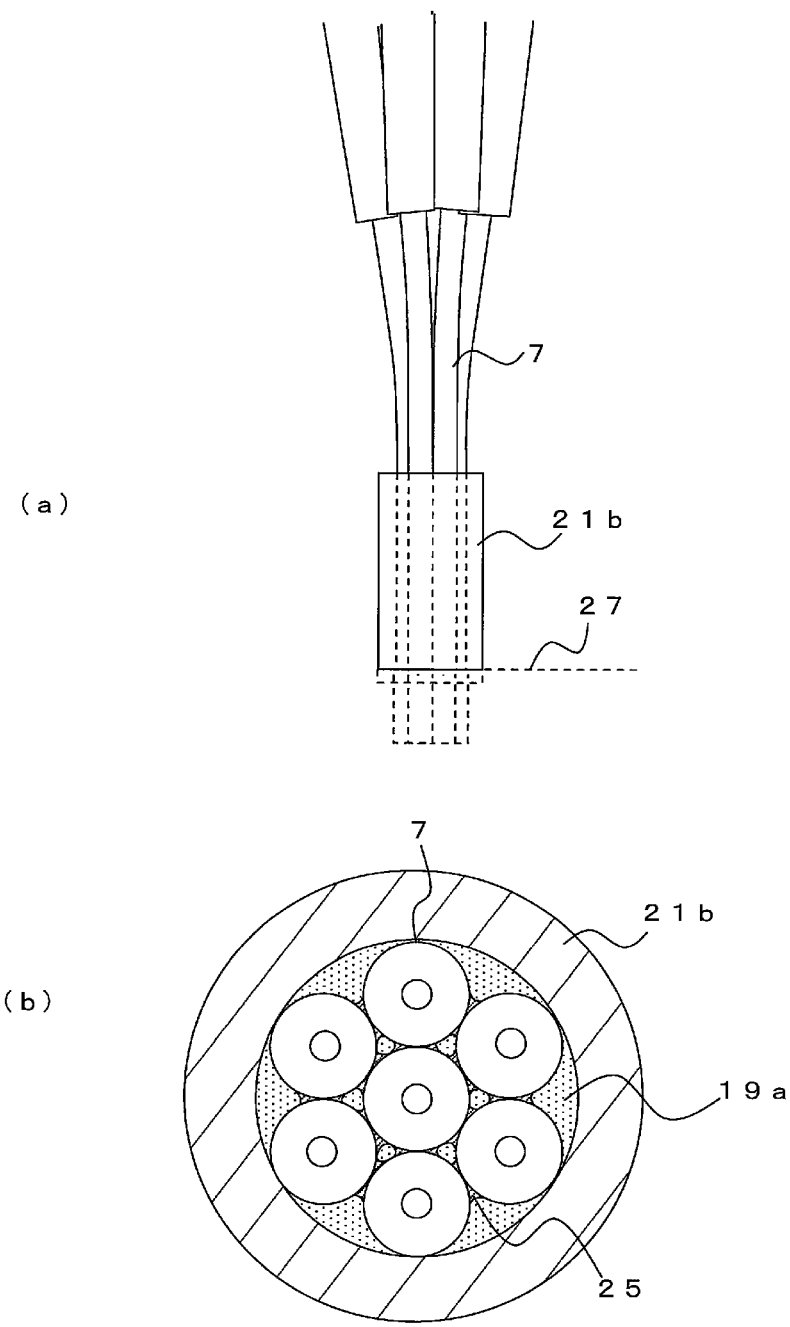
FIG. 6 show how the tip of a capillary is polished.

Next, as shown in FIG. 6, after the optical fibers 7 are bonded together in a close-packed state, the close-packed part is bonded to the capillary 21b. As an adhesive (the adhesive 19a) utilized on this occasion, heat hardening epoxy type adhesive or a UV hardening acrylate type adhesive may be used. The adhesive 19a bonds the fiber bundle and the capillary together such that the adhesive 19a fills up the gaps between the capillary 21b and the fiber bundle and the gaps between the optical fibers (between the neighboring adhesives 25). Although the capillary and the optical fibers are bonded together here, only the optical fiber bundles may be connected to the multi-core fiber, removing the capillary.

Next, the optical fibers 7 protruded from the capillary 21b and a part of the capillary 21b are ground at the polished surface 27. The bundle structure 5a is formed in this way. Also, a uniform surface may be obtained, not by polishing the end surface of the bundle structure, but by cutting it off with a dicing saw, etc., for example.

Although the adhesive 19a (19b) desirably has low viscosity, it can have viscosity higher than that of the adhesive 25 (5000 cps or less, for example). Also, the contraction percentage at the time of hardening is desirably low and the hardness is high (60 or more in Shore D scale). Although the hardness of the adhesive 25 is desirably high after hardening, the adhesive layer after hardening is fairly thin, and so effects that the hardness gives to the characteristics important at the time of polishing is small.

As such adhesives, for example, "Epo-tek 353-ND" (a trade name) made by EPOXY TECHNOLOGY, Inc. which is an epoxy type heat hardening adhesive, "OP-40Z" (a trade name) made by DIC corporation which is an acrylate type UV hardening adhesive, or a refractive-index control resin (UV hardening) made by NTT-Advanced Technology corporation can be utilized.

In this embodiment, although a step for inserting the plural optical fibers 7 into the capillary 21b is carried out first, there is no necessity that the present invention is limited to this. For example, the plural optical fibers 7 may be closely gathered and fixed together by the same method as this embodiment, and after that, the optical fibers 7 may be inserted into the capillary 21b and fixed by the second adhesive. In this occasion, the plural optical fibers 7 can be fixed into a close-packed structure by soaking the optical fibers 7 in the first adhesive 25, under the condition that they are inserted in a cylindrical temporary arranging member.

In this method, since insertion of the optical fibers 7 into the capillary 21b becomes easier, the clearance of the inner diameter of the capillary 21b can be made smaller.

Although the adhesive 19a is different from the adhesive 25 in the present embodiment, the adhesive 25 can be used also as the adhesive 19a. That is, such an adhesive 25 that contracts only a little when it hardens, and so does not create gaps between the fibers, can be used in order to closely gather and fix the neighboring fibers. Also in this case, the neighboring fibers can be closely gathered and fixed together utilizing the surface tension of the adhesive 25. It is desirable that the adhesive 25 has high hardness (60 or more at Shore D scale). In addition, the capillary is not indispensable and the connection structure may be formed directly within the optical connector.

In the present embodiment, a diluted solution type adhesive has been utilized as the adhesive 25, but the present invention is not limited to this and it is possible to obtain the same effect by using an adhesive having very low viscosity, without adhesive dilution. Also, it is desirable that the adhesive 25 has a low refractive index because it enhances the light confinement effect, but if the optical fibers having an enough light confinement effect are utilized, the adhesive 25 having a high refractive index can also be used.

Additionally, as a means to improve the aggregation effect of the optical fibers, wettability of the surface of the optical fibers 7 may be improved. As a means for improving the wettability, a method of spreading and drying the surface treatment agent called a primer and a method of performing plasma discharge process are known. It is natural and is desirable that the optical fibers 7 are fully kept clean during the process.

Figure 7:
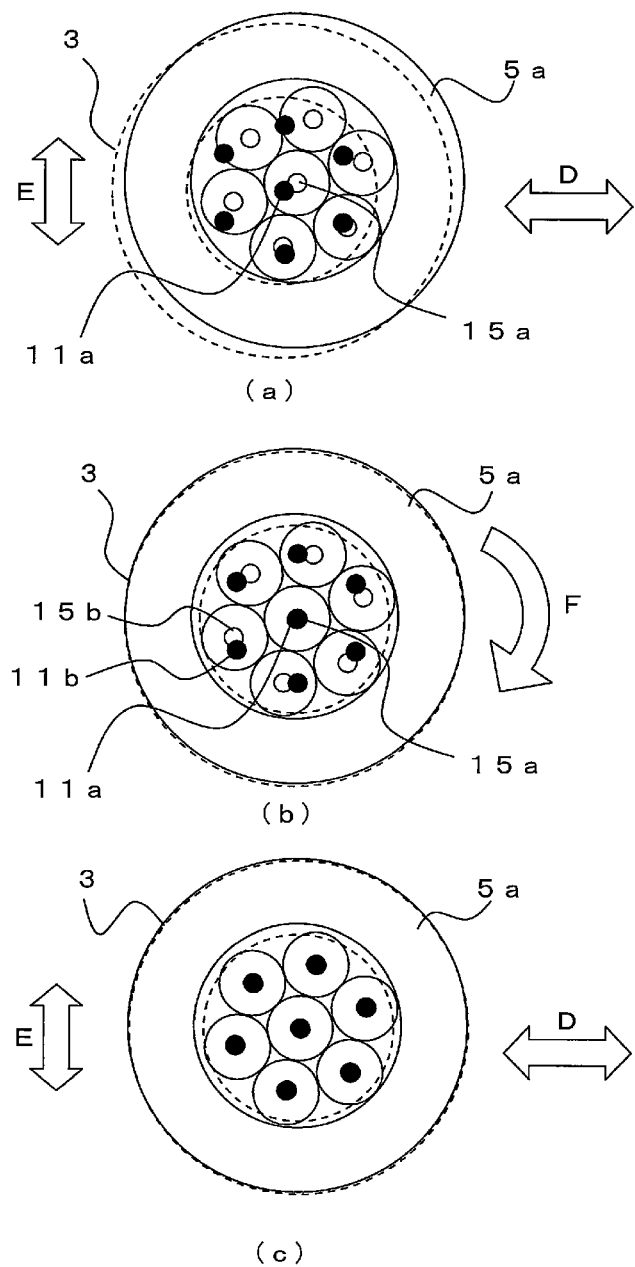

Next, a method for aligning the bundle structure with the multi-core fiber will be described in detail. FIG. 7 shows the method for aligning the bundle structure 5a with the multi-core fiber 3 where the multi-core fiber 3 is shown by a dotted line (the core part is black) and the bundle structure 5a is shown by a solid line (the core part is white). In the following examples, the method will be explained about the bundle structure 5a, but even on the bundle structures according to the other embodiments, the method can be performed similarly.

First, as shown in FIG. 7(a), the positions of the central core 11a and the central core 15a are adjusted, in a situation where the multi-core fiber 3 and the bundle structure 5a are faced mutually (the distance between the mutually facing end surfaces is 5 μm, for example). At this time, while the light is inputted from the multi-core fiber side for example, the multi-core fiber 3 (the capillary 21a) is moved in the X direction and in the Y direction which is perpendicular to the X direction (D and E directions in the figures, respectively) with respect to the bundle structure 5a (the capillary 21b).

When the positions of the central core 11a and the central core 15a are adjusted correctly as shown in FIG. 7(b), light intensity which is detected with the light detector connected to the core 15a, for example, is maximized. Instead, the light may be inputted from the core 15a side and detected at the core 11a side.

In this state, the multi-core fiber (the capillary 21a) is rotated about the cross-sectional center of the capillary 21a with respect to the capillary 21b (arrow F direction in the figure). At this time, the light is inputted, for example, from the cores 11 side and detected at the cores 15 side.

As shown in FIG. 7(c), when the positions of the cores 11 precisely overlap the cores 15, the light intensity detected with the light detector connected to the cores 15, for example, is maximized. Instead, the light may be inputted from the cores 15 side and detected at the cores 11 side.

It is also possible to align the bundle structure with the multi-core fiber by moving (rotating) the capillary 21b. However, rotation of the multi-core fiber 3 is favorable, because it is possible to make the clearance between the capillary 21a and the multi-core fiber 3 smaller. Thereby, the central positions of the capillary 21a and the multi-core fiber 3 are approximately coincided together. Therefore, if the capillary 21a is rotated about its cross-sectional center, the cross-sectional center of the multi-core fiber 3 serves nearly as the rotational axis.

As for the capillary 21b side, since the plural optical fibers 7 have to be inserted into it, bigger clearance is required compared with the clearance between the capillary 21a and the multi-core fiber 3. Thereby, the cross-sectional center of the capillary 21b and the cross-sectional center of the close-packed arrangement of the optical fibers 7 may not precisely agree with each other. Accordingly, when the cross-sectional center of the capillary 21b serves as a rotational axis, the cross-sectional center of the close-packed arrangement of the optical fibers 7 does not become a rotational center, and the position of the central core 15a itself may be moved from the position of the central core 11a. Therefore, it is desirable to fix the capillary 21b and rotate the capillary 21a.

Also, by repeating alignment of the central cores and that of another core, the detected intensity of the light at respective cores can be maximized. After completion of the above alignment, the five points alignment (an alignment method to calculate the present amount of axis misalignment from the detected light intensity at five positions: the current position; the positions moved in the ±X directions; and the positions moved in the ±Y directions, and to move the multi-core fiber by the optimal distance and in the optimal directions) can be utilized. After completion of the alignment, the multi-core fiber and the fiber bundle may be joined together and fixed by the adhesive or the like in that state.

Also, it is possible to utilize another alignment method. For example, it is possible to utilize a method for aligning arbitrary two cores first, and aligning the rest of cores after that. Specifically, the method is as follows: First, two cores placed on both sides of the central fiber on the X-axis are aligned by adjusting the positions in the X- and Y-direction and by rotation. Then, the amount of axis misalignment of every optical fiber (axis misalignment of the optical fiber in the X and Y directions) is measured and the multi-core fiber is moved in the optimal direction by optimal distance.

"Moved in the optimal direction by optimal distance" means here to "minimize the amount of the axis misalignment of the core on which the largest amount of axis misalignment is detected". Alternatively, a method in which the average amount of axis misalignment on all cores is minimized, or a method in which the mean square amount of the axis misalignment is minimized (the least square method) can be used.

Further, other alignment methods can be utilized. For example, the central cores are aligned first (FIG. 7(b)). Subsequently, a pair of cores of the optical fibers which is symmetrically placed on both sides of the central optical fiber are aligned through rotation around the center core. FIG. 8 show how the cores 15b and 15c of the optical fibers symmetrically placed with respect to the central core 15a are aligned with the cores 11b and 11c of the multi-core fiber through rotation. Even if the central cores are aligned, other cores may not precisely overlap each other because of the variation in the diameter of the fibers or the like.

In this case, alignment is performed so that the arrangement direction of a pair of cores 15b and 15c (G in the figures) and the arrangement direction of a pair of cores 11b, 11c (H in the figures) become parallel. In order to adjust so that the directions G and H become parallel, the light is inputted from the side of the cores 15b and 15c, for example, and the rotation angle can be estimated by the light intensity detected at the side of the cores 11b and 11c. Thus, when rotational alignment is performed on a pair of cores which are placed at symmetrical positions with respect to the central core as above, accurate alignment can be performed, even if the positions of the cores 15b and 15c are slightly dislocated from the symmetrical positions.

After performing the rotational alignment, the dislocation as a whole may be adjusted. For example, as shown in the FIG. 7(c), after aligning the positions of central cores and performing rotational alignment, the multi-core fiber 3 may be slightly moved in two directions (X direction and Y direction perpendicular to the X direction (D and E directions in the figure) relative to the bundle structure 5a. In this case, respective cores of the multi-core fiber 3 and respective optical fiber cores of the bundle structure 5a are optically connected, and intensities of the light from respective couples of cores are measured.

When the multi-core fiber 3 is slightly moved in the X and Y directions relative to the bundle structure 5a, the position where the detected light intensity is maximized (the positions where the amount of axis misalignment is minimized) may differ among the cores. In such a case, after the multi-core fiber is moved relatively in various directions, a suitable position is chosen where the amount of misalignment (the decrease percent of detected intensity relative to the maximum detected intensity, for example) of the core with largest amount of misalignment is minimum. Axis misalignment mentioned here is observed through transmission loss (the difference between the detected light intensity at the current position and the maximum detected light intensity), namely through axis misalignment loss. Namely, if the axis misalignment loss is measured, the amount of axis misalignment can be calculated. In general, the axis misalignment loss is proportional to the square of the amount of axis misalignment.

For example, we assume the following situation where: at a certain position, the average of the axis misalignment loss over the whole cores (the average of decreased amount of detected intensity compared to the detected maximum intensity at respective cores) is 3 dB and the axis misalignment loss of the core with the maximum axis misalignment is 5 dB. Then, the multi-core fiber 3 is slightly moved relatively to the bundle structure 5a from the above situation, and the average of the axis misalignment loss becomes 3.1 dB, and the axis misalignment loss of the core with the maximum axis misalignment becomes 4.5 dB. Then, this situation with smaller maximum axis misalignment loss can be judged to be appropriate. Further, the multi-core fiber 3 may be slightly moved relatively to the bundle structure 5a in the X and Y directions repeatedly, and may be fixed at the position where the maximum amount of axis misalignment is minimized.

The alignment may be performed such that not the maximum axis misalignment loss, but the average of axis misalignment loss over the whole cores is minimized. Moreover, the order of procedures in the foregoing alignment methods may be changed and each of the alignment methods may be combined.

According to the present invention, since the optical fibers 7 are combined in the close-packed arrangement, the intervals between the neighboring optical fibers 7 can be easily set equal. Accordingly, each of the cores 11 in the multi-core fiber 3 and each of the cores 15 in the optical fibers 7 can be optically connected with certainty.

Especially, since the optical fibers 7 are bonded together in the close-packed arrangement and they are held by a capillary or a holding member, connection work is easy. The circumferential direction of the close-packed arrangement of the optical fibers 7 with respect to the capillary 21b can be controlled in such a way that the hole of the capillary 21b is made to have a hexagonal shape or a projection 23 is formed inside the hole. Thereby, for example, if a mark, which can tell the arrangement of the internal optical fibers 7, is provided on the outer circumference of the capillary 21, the circumferential positions of the cores can easily be grasped in alignment work.

Also, as for the method for arranging optical fibers close-packed, the optical fibers 7 can be certainly and easily arranged close-packed and can be bonded together by utilizing the surface tension of the diluted adhesive 25. Then, the close-packed optical fibers 7 are bonded to the capillary 21b with an adhesive which has higher viscosity and higher hardness than the adhesive 25, and their end surfaces are ground. Thus, the capillary 21b and the optical fibers 7 can be reliably joined together, and at the same time, the ends of the optical fibers 7 are not damaged when they are ground.

Since the optical connector 10 of the present invention contains such a fiber connection structure 1a in its inside, a multi-core fiber having the same size as the embedded multi-core fiber 3 (or an optical connector which contains such multi-core fiber) can be easily connected to it. Also, the optical connector 10 can separate the multi-core fiber connected to it into plural optical fibers. That is, the optical fibers can be converted to the multi-core fiber and vice versa, within the optical connector 10.

Although the embodiments of the present invention have been described referring to the attached drawings, the technical scope of the present invention is not limited to the embodiments described above. It is clear that persons skilled in the art can think out various examples of changes or modifications within the scope of the technical idea disclosed in the claims, and it will be understood that they naturally belong to the technical scope of the present invention.

Figure 9:
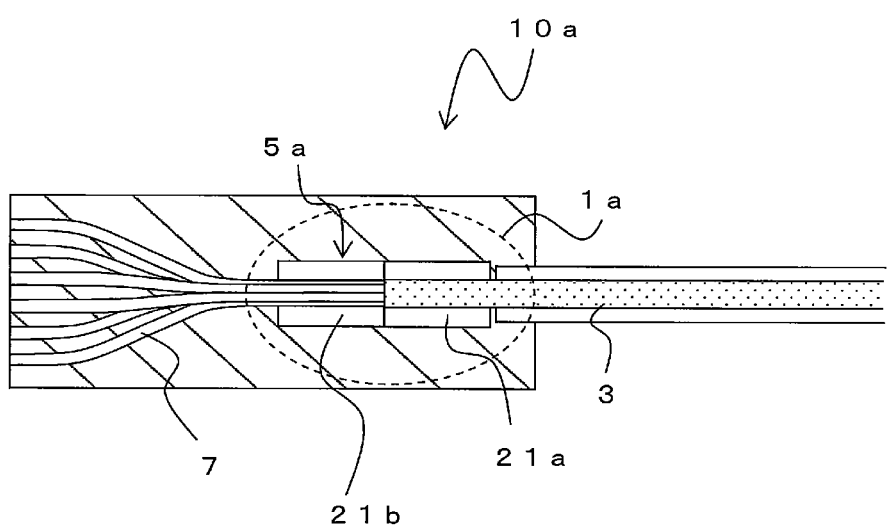

For example, although the end surface of the multi-core fiber 3 is exposed on the connector end surface of the optical connector 10, the present invention is not limited to this. FIG. 9 shows an optical connector 10a in which an end surface of the optical fibers 7 are exposed on the connector end surface.

In the optical connector 10a, similarly to the optical connector 10, the fiber connection structure 1a is contained inside and the optical fibers and the multi-core fiber can be converted to each other within the optical connector. In this case, the optical fibers 7 may be arranged such that the intervals between them are extended as they approach the end surface of the optical connector 10a.

For example, as described above, the pitch between the optical fibers 7 is equal to the core pitch of the multi-core fiber 3 (40 to 50 µm, for example) in the fiber connection structure 1a. On the other hand, at the end surface of the optical connector 10a, the intervals between the respective optical fibers 7 can be extended to a 125 µm pitch which is the normal diameter of an optical fiber, and thus the optical connector 10a can be easily connected to optical fibers of normal size. In this case, for example, it is desirable to place the optical fibers at the connector end surface in the arrangement that can be connected to optical fibers having the diameter of 125 µm arranged close-packed (arranged such that all the intervals between the optical fibers 7 are the same).

The intervals between the optical fibers may be 250 µm and in this case, the optical fibers can be connected to an MT connector which is frequently used generally. On this occasion, holes may be provided for guide pins to be connected to the MT connector. Also, the optical fibers do not have to be arranged in one row but it may be arranged in plural rows or in a round shape, etc.

That is, not only the optical fibers can be converted into the multi-core fiber or vice versa, but also the core intervals can be changed by utilizing the optical connector 10a.

Figure 10:
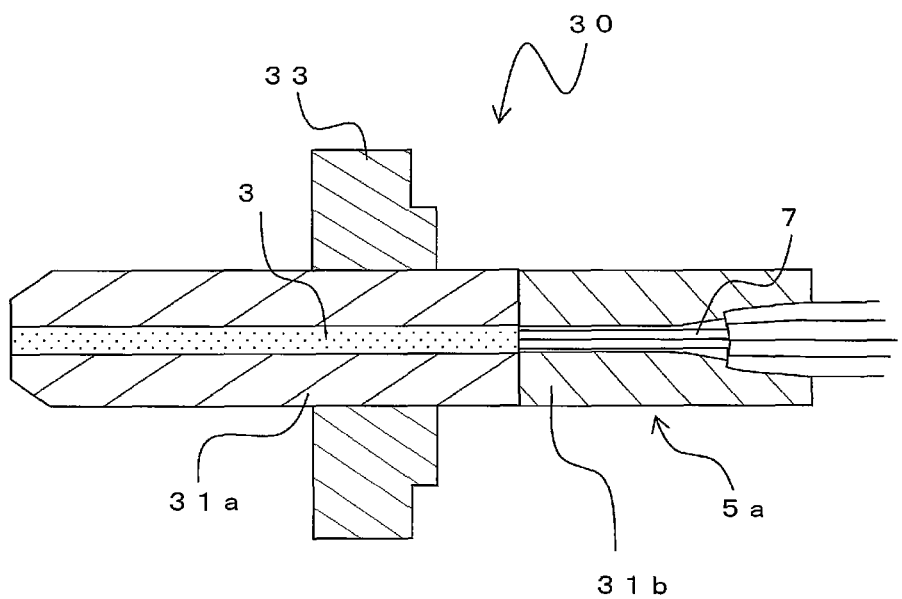
FIG. 10 shows an optical connector 30.

FIG. 10 further shows a connector 30 according to another embodiment. In the connector 30, the multi-core fiber 3 is inserted into a capillary 31a which is a first capillary. Similarly, the plural optical fibers 7 in the close-packed arrangement are inserted into the capillary 31b which is a second capillary, and the bundle structure 5a is formed. A connector flange part 33 is provided on the outer circumference of the capillary 31a. The connector flange part 33 is utilized when the connector is fixed to a housing of the connector, etc.

The capillary 31a placed on the front end side of the connector 30 and a capillary 31b placed on the rear end side of the connector 30 are joined together with an adhesive or by fusion splicing. The capillary 31a and the capillary 31b are joined together rearward the connector flange 33. Also, in the joint between the capillary 31a and the capillary 31b, the multi-core fiber 3 and the optical fibers 7 are optically connected. The effects of the present invention can be obtained also by the connector 30.

Figure 11:
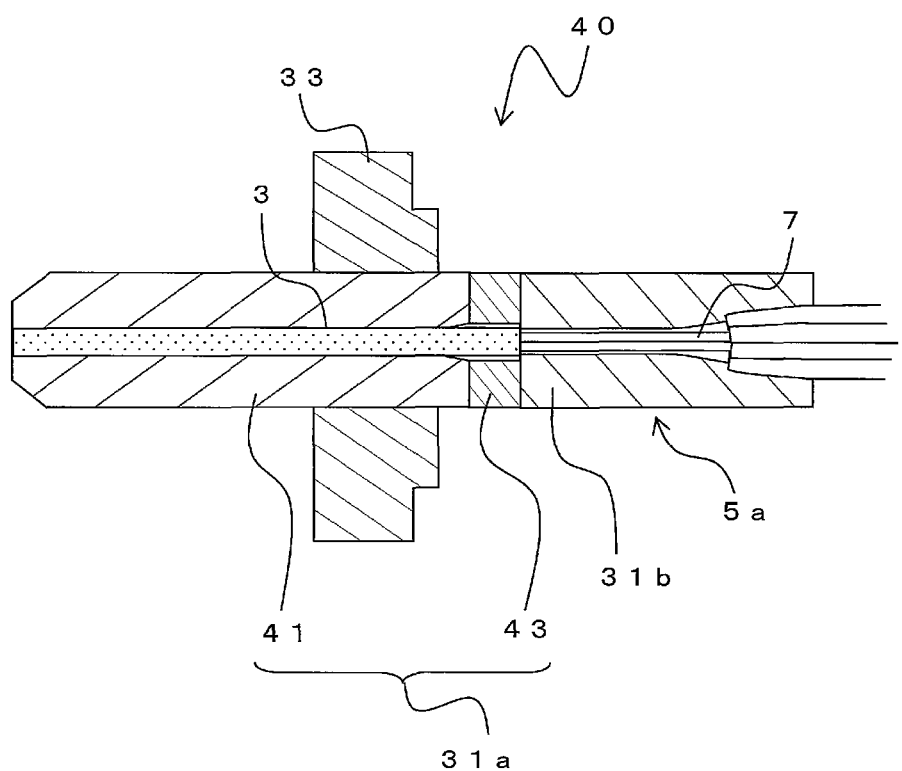
FIG. 11 shows an optical connector 40.
Figure 1:
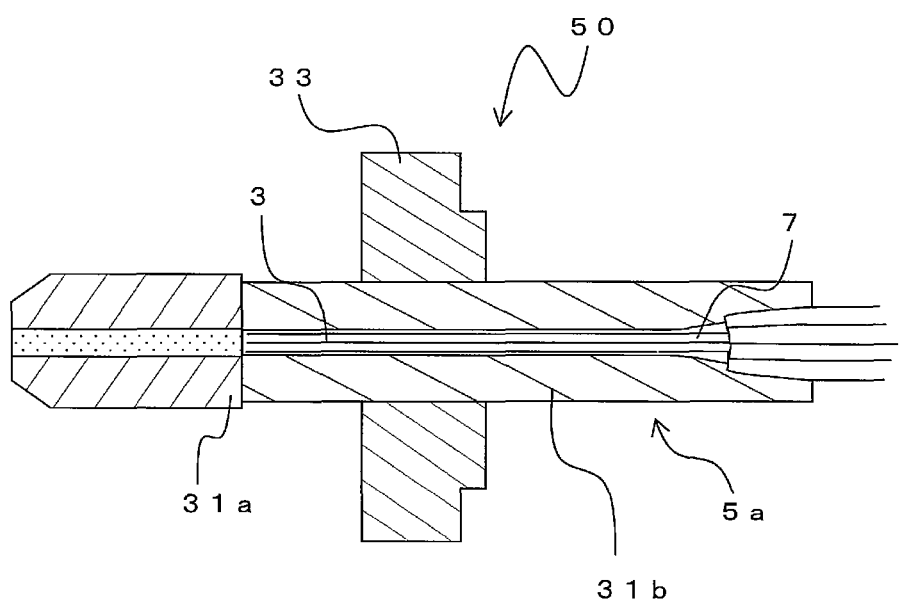

FIG. 11 shows a connector 40 according to further another embodiment. Although the connector 40 is approximately the same as the connector 30, the capillary 31a consists of a zirconia capillary 41 and a glass capillary 43. The front side of the capillary 31a is the zirconia capillary 41 and its rear side is the glass capillary 43.

In the connector 40, the capillary 31a and the capillary 31b are bonded together with an ultraviolet hardening adhesive. On this occasion, since the capillary 31a is the glass capillary 43 in the vicinity of the joint with the capillary 31b, ultraviolet rays can penetrate through the capillary 43 to its border planes. Thereby, by applying the ultraviolet hardening adhesive to the joined area in advance and irradiating the joint area with the ultraviolet rays from the exterior, the capillary 31a and the capillary 31b can be easily bonded together. In this case, it is desirable that the capillary 31b is also transparent and made of glass or the like.

FIG. 12 shows an optical connector 50 according to further other embodiment. Although, the optical connector 50 is approximately the same as the connector 30, the joint between the capillary 31a and the capillary 31b is placed on the front side of the connector flange part 33. That is, the connector flange part 33 is placed on the outer circumference of the capillary 31b.

In the optical connector 50, the external diameter of the capillary 31a is larger than the external diameter of the capillary 31b. Thereby, the outer circumference of the capillary 31b does not spread out of the outer circumference of the capillary 31a at the time of connection with another connector. Therefore, at the time of connection with another connector, the capillary 31b does not interfere with another connector. Also in the optical connector 50, the capillary 31a may be made of the zirconia capillary 41 and the glass capillary 43.

Figure 13:
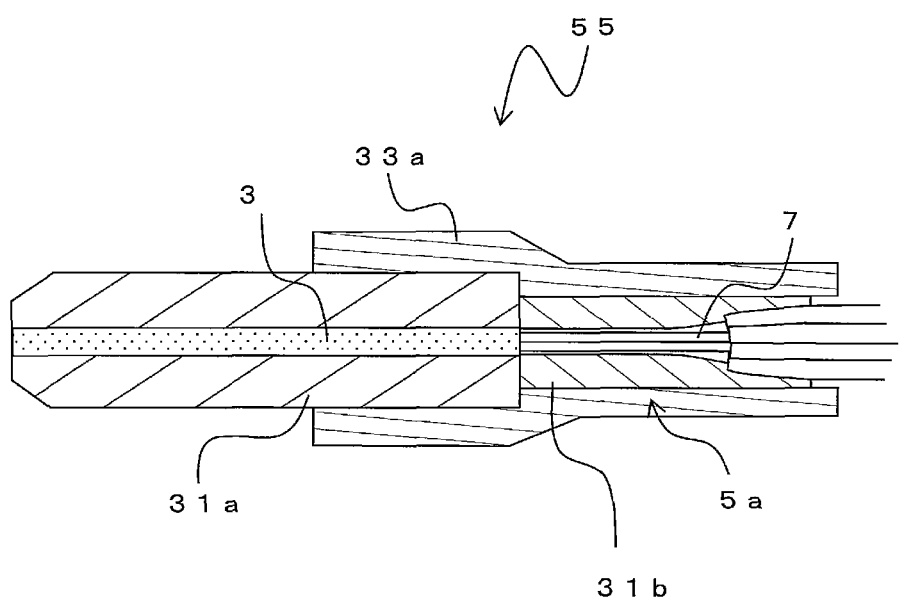
FIG. 13 shows an optical connector 55.

FIG. 13 shows an optical connector 55 according to further other embodiment. Although the optical connector 55 is approximately the same as the connector 30 and the like, it differs in that the joint between the capillary 31a and the capillary 31b is held within a connector flange part 33a. The connector flange part 33a is for an MU connector. In this case, the connector flange part 33a may be attached after the multi-core fiber 3 and the bundle structure 5a are aligned and connected together.

On this occasion, if the connector flange part 33a and the multi-core fiber are matched under some rule in the circumference direction, respective core parts of the multi-core fiber can be placed at the predetermined circumferential positions with respect to the connector flange part 33a. Also, an Oldham-coupling-compatible flange may be utilized for the connector flange 33a. In addition, although a structure of an MU connector is shown in the present example, the structure of the connector may be other than that of the MU connector (an SC connector, for example).

Figure 14:
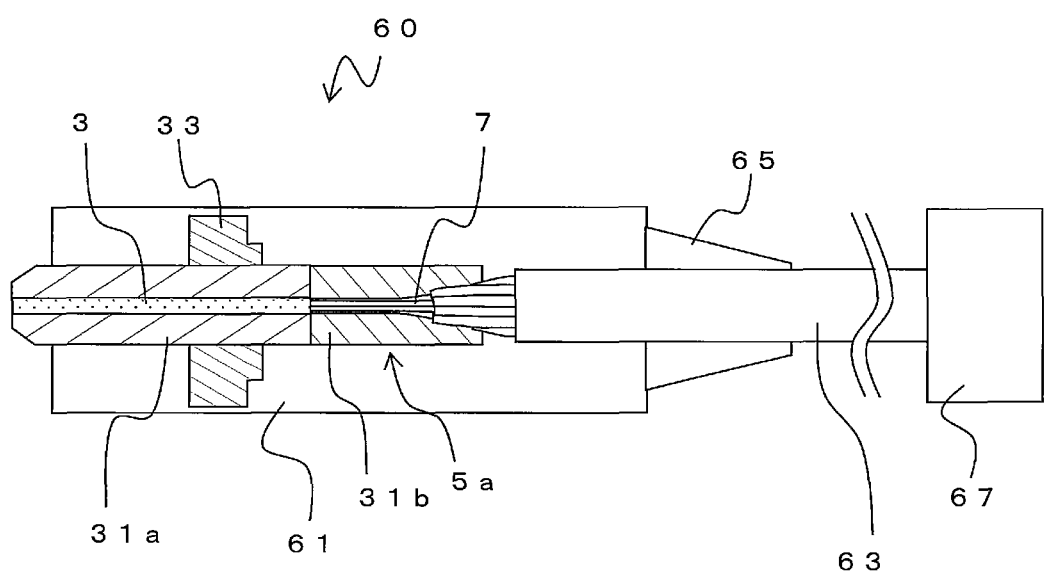
FIG. 14 shows a connector structure 60.
Figure 1:
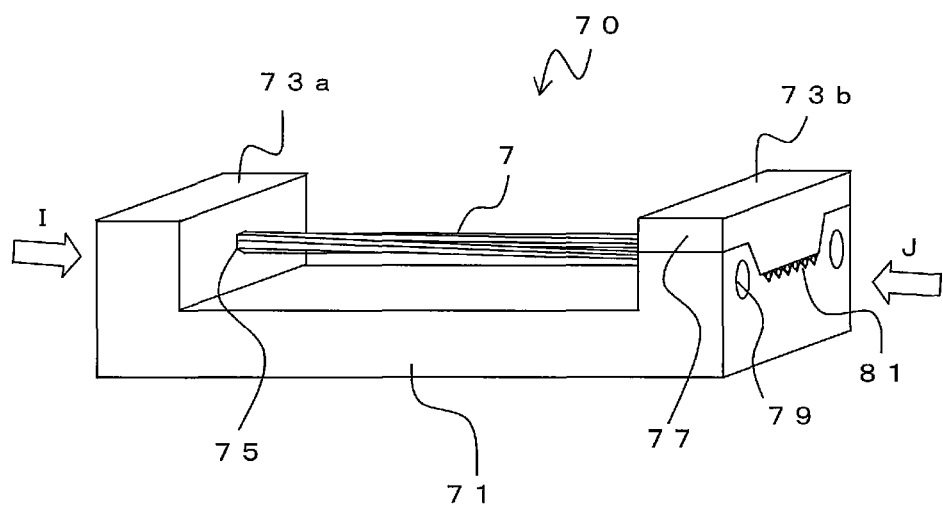

FIG. 14 shows a connector structure 60 utilizing each of the foregoing connectors. In the connector structure 60, one of the optical connectors 30 to 50 (the connector 30 is shown in the figure as an example) is accommodated in a housing 61. Boot 65 is provided behind the housing 61. Within the boot 65, the optical fibers 7 which are pulled out of the capillary 31*b* are configured into an optical fiber ribbon. That is, an optical fiber ribbon 63 is pulled out from the connector part on one end of the connector structure 60.

A common MT connector 67 is connected to the other end of the optical fiber ribbon 63. The MT connector 67 can be connected to other optical fibers. That is, the multi-core fiber 3 is exposed from the connector part on one end of the connector structure 60 and the optical fibers are protruded out in a row from the connector part on the other end. Accordingly, by using the connector structure 60, a multi-core fiber (or a bundle structure) and optical fibers (or the optical fiber ribbons) can be connected together easily.

FIG. 15 shows a fiber arrangement conversion member 70. The fiber arrangement conversion member 70 is composed of a main body 71 and optical fibers 7. One end of the main body 71 is a fixing part 73*a* and is a first fixing part. The other end of the main body 71 is a fixing part 73*b* and is a second fixing part. A hole 75 is provided in the fixing part 73*a*.

FIG. 16(*a*) is a view from the arrow I shown in the FIG. 15 and a side view of the fiber arrangement conversion member 70. The hole 75 formed in the fixing part 73*a* is a through hole having an approximately hexagonal shape. In the hole 75, the optical fibers 7 are arranged close-packed and are bonded to the hole 75 with an adhesive, etc. Such a structure may be formed as shown in the FIG. 4 to FIG. 6. End surfaces of the optical fibers 7 are exposed on an end surface of the fixing part 73*a*. Thereby, the optical fibers 7 can be optically connected to close-packed cores of a multi-core fiber, etc.

As shown in the FIG. 15, a lid 77, V grooves 81, guide holes 79, etc. are formed in the fixing part 73*b*. FIG. 16(*b*) is a view from the arrow J shown in the FIG. 15 and is a side view of the fiber arrangement conversion member 70. The plural V grooves 81 are provided at predetermined intervals in one row in the fixing part 73*b*. The optical fibers 7 are accommodated in the V grooves 81, respectively, and are pressed down by the lid 77 from above. Thereby, the optical fibers 7 are fixed being arranged in parallel in one row. The optical fibers 7 may be bonded to the V grooves 81 with an adhesive or the like. Also, the lid 77 and the main body 71 may be fixed together with an adhesive.

A pair of the guide holes 79 are formed on both sides of the row of the optical fibers 7. The guide holes 79 are sites where the guide pins are inserted into when the member is connected to another connector. The position of the optical fibers can be adjusted utilizing the guide pins. The guide holes may be formed also on the fixing part 73*a*.

End surfaces of the optical fibers 7 are exposed on the end surface of the fixing part 73*b*. Accordingly, the optical fibers 7 can be connected to another optical fiber ribbon or the like in which optical fibers are arranged in one row. That is, by using the fiber arrangement conversion member 70, the multi-core fiber and the optical fiber ribbon or the like can be connected easily to each other. The fiber arrangement conversion member 70 may be embedded within the connector.

Although, in the forgoing embodiments, examples of the bundle structure suited for the multi-core fiber having seven cores are shown, the present invention is not limited to these. For example, the present invention is applicable to a multi-core fiber having nineteen cores equipped with one more core layer outside the seven cores. In this case, the same effects as the above examples can be obtained by using a bundle structure having nineteen optical fibers manufactured by utilizing the same method.

FIG. 17(*a*) shows a jig 83 for manufacturing the bundle structure having nineteen cores. A hole 85 is formed in the center of the jig 83 and twelve holes 87 are formed on the approximately hexagonal line around the hole 85. The optical fibers 7 which are bundled in advance are inserted into the hole 85. Namely, the seven optical fibers 7 joined (temporarily) in advance in the close-packed arrangement in the cross-section are inserted into the hole 85. The optical fibers 7 are inserted into the holes 87, respectively.

FIG. 18(*a*) shows a longitudinal cross-section at the K-K line in the FIG. 17. The bundled seven optical fibers 7 in the center and the optical fibers 7 around them are soaked in the adhesive 25 such that their neighboring ends are made contact with each other. This will allow the additional twelve optical fibers 7 to be closely gathered together by the surface tension on the circumference of the close-packed seven optical fibers 7.

As shown in FIG. 18(*b*), the holes 87 may be obliquely formed along the direction of insertion of the optical fibers 7. Also, the placement or the size of the holes 85 and 87 of the jig 89 can be set suitably according to the number of the optical fibers to be bundled.

The intervals between the cores in the multi-core fiber may not necessarily be uniform. In such a case, the external diameters (all the optical fibers do not have the same external diameter) of the optical fibers which will be bundled may be selected suitably according to the core pitches of the multi-core fiber.

On this occasion, a jig such as the jig 89 shown in FIG. 17(*b*) may be utilized. For example, the central optical fiber 7 having a large diameter may be inserted into the hole 85 and the peripheral optical fibers having smaller diameter may be inserted into the holes 87, respectively. A bundle structure comprising closely gathered optical fibers can be obtained by a procedure in which the ends of the optical fibers are soaked in an adhesive, etc.

FIG. 19(*a*) shows a multi-core fiber 90 having 10 cores and FIG. 19(*b*) shows a bundle structure 91 manufactured by the method shown in the FIG. 17(*b*). As shown in the FIG. 19(*a*), ten cores 11 are placed in the cladding 13 of the multi-core fiber 90. That is, nine cores 11 are placed around the central core 11 with the central angle of forty degrees for each.

As shown in the FIG. 19(*b*), the respective optical fibers 7 in the bundle structure 91 are arranged so that the bundle structure can be connected to the above multi-core fiber 90. By the arrangement of the optical fibers 7 in a closely gathered state, the connection of the bundle structure 91 to the multi-core fiber 90 can be realized. Here, for a bundle structure corresponding to the multi-core fiber having one central core and n cores around it arranged at the same interval, the following Equation 1 holds, where R is the radius of the cladding 17 of the central optical fiber 7 and r is the radius of the optical fibers 7 placed around it.

$$R = \frac{1 - \sin\left(\frac{180}{n}\right)^\circ}{\sin\left(\frac{180}{n}\right)^\circ} r \qquad \text{Equation 1}$$

When the radii of the central optical fiber R and the peripheral optical fibers r satisfy the equation 1, the bundle structure possible to be connected to the multi-core fiber as described above, can be obtained.

EXPLANATION OF NUMERALS

1a . . . fiber connection structure
3, 90 . . . multi-core fiber
5a, 5b, 5c, 91 . . . bundle structure
7 . . . optical fiber
10,10a,30,40,50,55 . . . optical connector
11,11a . . . core
12 . . . ferrule
13 . . . cladding
15,15a,15b,15c . . . core
17 . . . cladding
19a,19b . . . adhesive
21a,21b,31a,31b . . . capillary
23 . . . projection
25 . . . adhasive
27 . . . polished surface
33,33a . . . connector flange part
41 . . . zirconia capillary
43 . . . glass capillary
60 . . . connector structure
61 . . . housing
63 . . . optical fiber ribbon
65 . . . boot
67 . . . MT connector
70 . . . fiber arrangement conversion member
71 . . . main body
73a,73b . . . fixing part
75 . . . hole
77 . . . lid
79 . . . guide hole
81 . . . V groove
83, 89 . . . jig
85, 87 . . . hole

What is claimed is:

1. An optical connector comprising:
a ferrule on an end surface of the optical connector, wherein:
the optical connector contains a fiber connection structure which optically connects a multi-core fiber having plural cores at predetermined intervals with a bundle structure having plural optical fibers bundled,
the fiber connection structure is accommodated in the optical connector,
an end of the bundle structure is connected to the multi-core fiber, and
the end of the multi-core fiber is exposed on an end surface of the optical connector;
the ferrule comprises:
a first capillary on the front side of the ferrule; and
a second capillary on the rear side of the ferrule,
the multi-core fiber is inserted into the first capillary,
the bundle structure is inserted into the second capillary,
the second capillary is a cylindrical member which has a hole inside,
the plural optical fibers are inserted into the hole in a bundled state,
covers of ends of the plural optical fibers are removed, and
a boundary between the portion where the covers of the plural optical fibers are removed and a portion having the covers is disposed inside the second capillary.

2. The optical connector according to claim 1, wherein:
the optical connector further comprises:
a connector flange part,
wherein:
the multi-core fiber is inserted into the first capillary;
the bundle structure is inserted into the second capillary; and
the first capillary and the second capillary are joined together rearward the connector flange part.

3. The optical connector according to claim 1, wherein:
the optical connector further comprises:
a connector flange part,
wherein:
the first capillary and the second capillary are joined together frontward the connector flange part; and
the external diameter of the second capillary is smaller than that of the first capillary.

4. The optical connector according to claim 2, wherein:
the first capillary consists of a zirconia capillary and a glass capillary, and
a rear end side of the first capillary is joined to the second capillary with an adhesive.

5. An optical connector comprising:
a ferrule on an end surface of the optical connector;
the optical connector contains a fiber connection structure which optically connects a multi-core fiber having plural cores at predetermined intervals with a bundle structure having plural optical fibers bundled; and
the fiber connection structure is accommodated in the optical connector,
wherein:
an end of the bundle structure is connected to the multi-core fiber, and
the end of the multi-core fiber is exposed on an end surface of the optical connector, the optical connector further comprising:
a first capillary on the front side of the ferrule;
a second capillary on the rear side of the ferrule; and
a connector flange part,
wherein:
the multi-core fiber is inserted into the first capillary,
the bundle structure is inserted into the second capillary, and
the first capillary and the second capillary are joined together frontward the connector flange part.

6. The optical connector according to claim 5, wherein:
the external diameter of the second capillary is smaller than that of the first capillary.

7. The optical connector according to claim 5, wherein:
the first capillary consists of a zirconia capillary and a glass capillary, and
the glass capillary on the rear end side of the first capillary and the second capillary are joined together with an adhesive.

* * * * *